United States Patent [19]

Hall

[11] 4,066,239

[45] Jan. 3, 1978

[54] METERING SLOT CONFIGURATION FOR A VALVE SPOOL

[75] Inventor: Lowell R. Hall, Elwood, Ill.

[73] Assignee: Caterpillar Tractor Co., Peoria, Ill.

[21] Appl. No.: 778,278

[22] Filed: Mar. 16, 1977

Related U.S. Application Data

[63] Continuation-in-part of Ser. No. 664,443, March 8, 1976, abandoned.

[51] Int. Cl.² .......................... F15B 13/42; F16K 47/04
[52] U.S. Cl. .................................. 251/31; 137/625.3; 137/625.63; 137/625.69; 251/324
[58] Field of Search ........... 137/625.3, 625.63, 625.69; 251/31, 120, 282, 324

[56] References Cited

U.S. PATENT DOCUMENTS

| | | | |
|---|---|---|---|
| 3,009,480 | 11/1960 | Miller | 137/625.69 |
| 3,483,890 | 12/1969 | Oldenburg et al. | 137/596.12 |
| 3,771,564 | 11/1973 | Bianchetta et al. | 137/625.63 |
| 3,817,276 | 6/1974 | Schexnayder | 137/491 |
| 4,009,864 | 3/1977 | Schexnayder | 137/625.69 X |

*Primary Examiner*—Alan Cohan
*Assistant Examiner*—Gerald A. Michalsky
*Attorney, Agent or Firm*—John W. Grant

[57] ABSTRACT

A fluid control valve includes a valve body having a pump inlet port and a drain outlet port and is of a construction sufficient for connecting the pump inlet port to a relatively high pressure pump and the drain outlet port to a substantially atmospheric pressure reservoir. A valve spool has a metering slot leading from the peripheral surface of a first land to a peripheral surface of a second land, the metering slot including a substantially cylindrical pocket recessed into the second land, and a groove formed in the first land and a reduced diameter portion positioned between the lands. The groove connects the peripheral surface of the first land with the cylindrical pocket and has an arcuate surface portion leading from the peripheral surface of the first land and an elongated bottom surface positioned substantially parallel to the longitudinal axis of the spool and tangent to the arcuate surface portion. The spool is movable along its longitudinal axis between a first position at which flow from the pump inlet port to the drain outlet port is metered outwardly relative to the spool through the cylindrical pocket and a second position at which fluid flow from the pump inlet port to the drain outlet port is metered inwardly through the groove. The metering slot is of a construction sufficient for directing the fluid metered inwardly through the groove into the cylindrical pocket to generate a force acting on the spool tending to close the metering slot.

3 Claims, 4 Drawing Figures

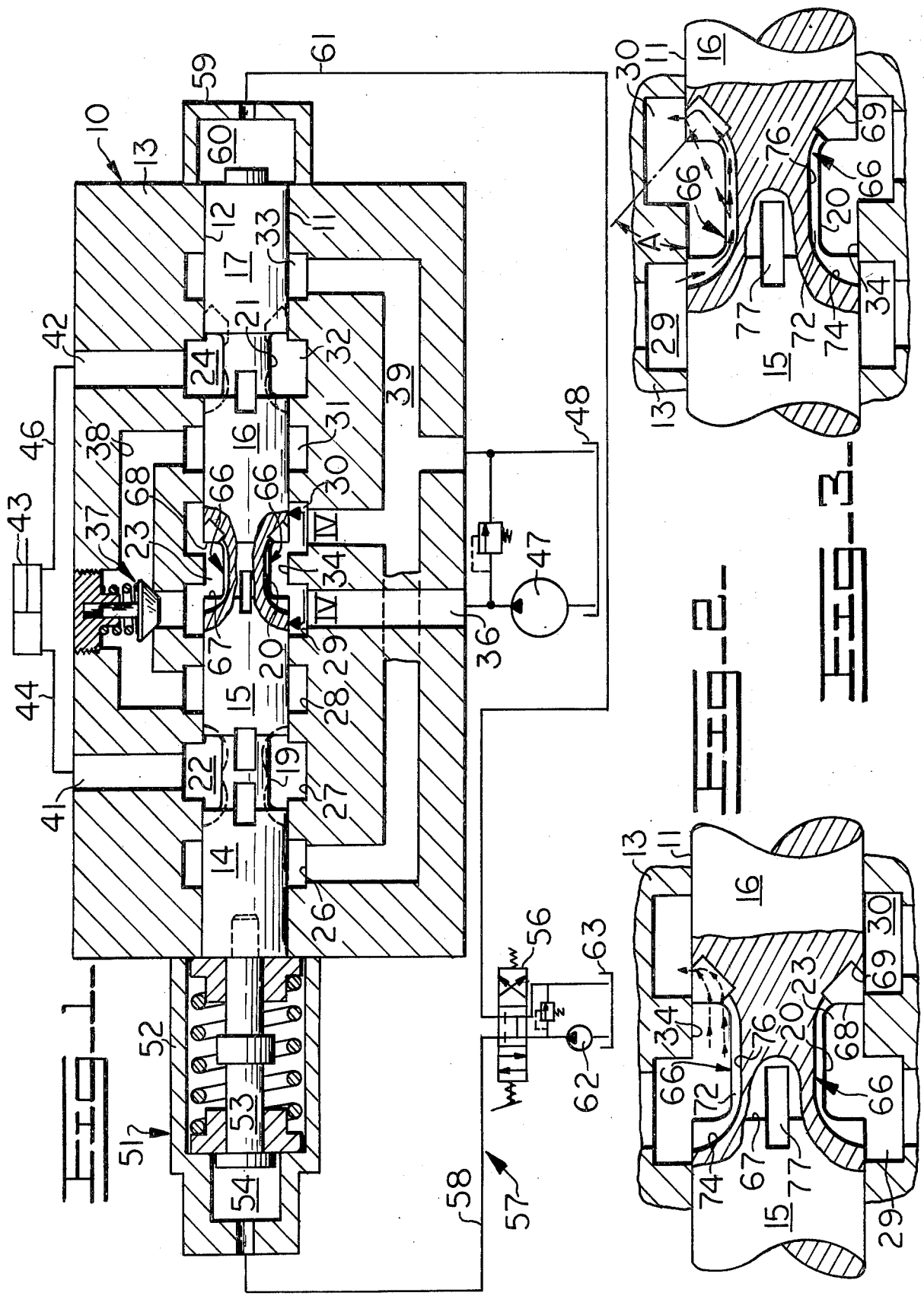

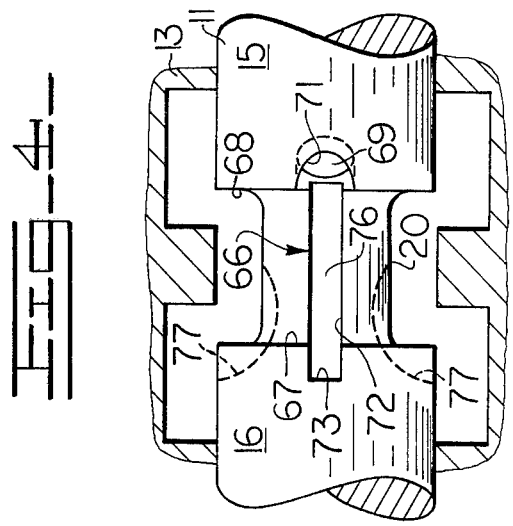

METERING SLOT CONFIGURATION FOR A VALVE SPOOL

This application is a continuation-in-part of Ser. No. 664,443, filed Mar. 8, 1976, now abandoned.

BACKGROUND OF THE INVENTION

The valve spools of hydraulic control valves are commonly provided with metering slots or notches connecting an annular groove with a peripheral surface of an adjacent land. The slots provide a metering effect of the fluid flow therethrough and thus more precise control over the actuation of a hydraulic motor or jack than can be achieved by a simple spool shoulder. The two basic types of fluid flow through the slots are referred to as "meter in" wherein the fluid metered through the slots is in a direction toward the spool and "meter out" wherein the fluid metered through the slots is in a direction outwardly from the spool.

It is well known that the fluid flowing through a valve exerts a force against the spool. Although a mathematical analysis of the flow forces has been evasive, a substantial portion of the flow forces acting on the spool during a metering condition are attributed to the momentum force of the fluid. Momentum force can best be explained as the force exerted on the spool by the fluid when the spool changes the direction of fluid flow. The flow force increases with an increase in either velocity or pressure drop of the fluid. Heretofore, valve spools have been designed to neutralize the flow forces or to reduce the force to an acceptable level. It is found in practice that the end mill slot when used in a meter out condition and the key cutter slot when used in a meter in condition are effective in reducing the flow forces at high flows and pressures.

The two types of metering conditions i.e., meter in and meter out, usually present drastically different flow forces acting on the valve spool. For example, in a meter out condition, the fluid flow has always produced a flow force acting on the spool in a direction tending to close the metering slot regardless of the slot configuration. However, in a meter in condition, the flow force may either tend to close or open the metering slot. Thus depending on the particular metering situation, the flow force urges the valve spool either in the direction tending to close the metering slot or in the opposite direction tending to open the metering slot.

Some hydraulic control valves have a pump port disposed between a pair of tank ports with the valve spool normally communicating the pump port with both of the tank ports. To establish fluid pressure in the hydraulic system, the valve spool may be shifted in either direction to block the pump port from both of the tank ports and communicate the pump port with a motor port which is connected to a hydraulic motor or jack. In an effort to reduce the complexity of the valve body casting and to provide a valve which is more compact, one of the tank ports has been deleted in some valve designs so that the valves are provided with a pump port which is normally in communication with a single axially adjacent tank port through an annular groove of the valve spool. To establish fluid pressure in the hydraulic system for actuating a hydraulic motor or jack, the valve spool may be shifted in either direction to initially meter and eventually block fluid flow from the pump port to the tank port and to connect the pump port with one side of the hydraulic motor to communicate pressurized fluid thereto. Thus, in one direction of spool travel, a meter out condition exists while in the opposite direction of spool travel a meter in condition exists. In this environment and when the more common key cutter type metering slots are employed, the metering out condition produces a flow force acting on the spool in a direction tending to close the slot. Conversely, depending on the particular geometry of the slot, the meter in condition can produce a flow force acting on the spool tending to either open or close the metering slot.

When the above described type of valve design is employed in a manually operated system the same amount of lever movement by the operator will generate substantially equal flow in either direction of shift assuming equal load resistant upon the hydraulic jack. Different shifting effort will be required, but lever movement will be approximately the same.

However, a problem is encountered when that type of control valve is employed as the main control valve of a pilot operated system wherein the valve spool of the main control valve is actuated by fluid pressure. In such an arrangement, lever movement by the operator does not directly cause movement of the main control valve spool, but generates only a pressure output directed to the appropriate end of the valve spool. Thus, since the flow force against the main control spool can react in different directions, the same amount of lever movement of the pilot control valve does not always provide equal amounts of movement of the main control valve spool. This makes it difficult for the operator to judge how far to actuate the control lever to achieve a particular speed of the hydraulic motor or jack.

OBJECTS OF THE INVENTION

Accordingly, an object of this invention is to provide an improved hydraulic control valve having a metering slot configuration which provides the same type of flow force acting on the valve spool in both directions of travel of the valve spool.

Another object of the present invention is to provide such an improved control valve which provides substantially equal flow forces acting on the spool in both directions of spool travel.

Another object of this invention is to provide an improved control valve of the character described which reduces the flow force acting on the spool to as low a level as possible.

Other objects and advantages of the present invention will become more readily apparent upon reference to the accompanying drawing and following description.

BRIEF DESCRIPTION OF THE DRAWINGS

FIG. 1 is a side elevational view of a control valve embodying the principles of the present invention.

FIGS. 2 and 3 are enlarged fragmentary views illustrating operational positions of the valve spool.

FIG. 4 is a plan view of a metering slot as viewed from line IV—IV.

DESCRIPTION OF THE PREFERRED EMBODIMENT

Referring now to FIGS. 1 through 4 of the drawings, a fluid flow control valve is generally indicated by the reference numeral 10 and includes a valve spool 11 reciprocable within a longitudinally extending bore 12 in a valve body 13. The valve spool has a plurality of lands 14, 15, 16 and 17 which are axially separated by a plurality of reduced diameter portions 19, 20 and 21 forming a plurality of annular grooves 22, 23, and 24. A plurality of axially spaced annuluses or flow chambers 26, 27, 28, 29, 30, 31, 32 and 33 are formed in the valve body in communication with the bore with the flow chambers 29 and 30 separated by an annular seat land 34. An inlet port 36 communicates with the flow chamber 29 which is in turn connected to the flow chamber 28 and 31 through a spring loaded check valve 37 and a passage 38. The flow chambers 26, 30 and 33 are connected to a common drain passage 39. A pair of motor ports 41 and 42 connect the flow chambers 27 and 32 to the head end and rod end, respectively, of a hydraulic jack 43 through a pair of conduits 44 and 46. A pump 47 is connected to the inlet port to supply pressurized fluid to the flow chamber 29 while the drain passage is continuously connected to a tank 48.

A resilient centering mechanism 51 is contained within a housing 52 suitably secured to one end of the body 13 and is operatively connected to a stem 53 which is screw threadably secured to the valve spool 11. The centering mechanism is operative to return the valve spool to the neutral or centered position as shown in FIG. 1 from an actuated position in either direction when an external force is exerted thereon. The housing defines an actuating chamber 54 at one end of the valve spool and is connected to a manually actuated selector valve 56 of a pilot system 57 through a pilot conduit 58. An adapter housing 59 is similarly secured to the other end of the body and provides an actuating chamber 60 at the other end of the valve spool. The actuating chamber is connected to the selector valve through another pilot conduit 61. A pilot pump 62 is connected to the selector valve for directing pressurized pilot fluid thereto while the fluid exhausted from the selector valve is returned to a tank 63.

As more clearly shown in FIGS. 2 and 3, the present invention includes a pair of metering slots 66 which are formed on diametrically opposite sides of the valve spool 11. Each of the metering slots is cut into an end face 67 of the land 15, the reduced diameter portion 20 and an end face 68 of the land 16. Each of the metering slots include a substantially cylindrical pocket 69 which is recessed into the land 16 and is formed as by advancing an end mill along its axis into the land at an angle A relative to the longitudinal axis of the spool to a predetermined depth. The angle A is selected from the range of 40° to 60° and in the present case is 45°. The cylindrical pocket intersects both the end face 68 and the peripheral surface of the land 16 adjacent to the end face and defines a semielliptical opening 71 in the peripheral surface as best shown in FIG. 4. Although the cylindrical pocket is illustrated as having a flat bottom, alternatively the bottom surface may have a spherical shape. Each metering slot also includes a longitudinally extending groove 72 which is formed in the land 15 and the reduced diameter portion 20 and connects the peripheral surface of land 15 adjacent to the end face 67 with the cylindrical pocket. The groove 72 is formed as by first advancing a Woodruff key cutter radially toward the axis of the spool to a predetermined depth with the axis disposed substantially normal to the axis of the spool and then transversing the Woodruff key cutter longitudinally relative to the spool between the cylindrical pocket and the land 15 while maintaining the Woodruff key cutter at the predetermined depth. This provides a rectangular opening 73 at the intersection of the groove and the peripheral surface, an arcuate surface 74 leading from the edge of the opening remote from the end face 67, and a bottom surface portion 76 which is tangent to the arcuate surface and terminates in the cylindrical pocket. The portion of the bottom surface terminating in the cylindrical pocket has a slight arcuate curvature thereto and is pointed generally toward the side wall of the cylindrical pocket diametrically opposite to the opening of the groove into the cylindrical pocket. An additional pair of arcuate key cutter metering slots 77 are provided in the spool and connect the land 15 with the annular groove 23 in the usual manner.

OPERATION

While the operation of the present invention is believed clearly apparent from the foregoing description, further amplification will subsequently be made in the following brief summary of such operation. With the selector valve 56 in the position shown, the pilot conduits 58 and 61 are open to the tank 63 and the valve spool 11 is retained in the neutral or centered position shown by the resilient centering mechanism 51. With the valve spool in such position, fluid from the pump 47, which may be considered as continuously operating, is directed into the inlet port 36 and passes substantially unrestricted from the flow chamber 29 to the flow chamber 30 through the annular groove 23 and to the drain passage 39 where it is returned to the tank 48 without having effected the position of the hydraulic jack 43.

Shifting the selector valve 56 to the left directs pressurized pilot fluid through the pilot conduit 61 and into the actuating chamber 60 of adapter housing 59 where the pilot fluid acts against the end of the valve spool 11 forcing it to the left against the resiliency of the centering mechanism 51. The leftward movement of the spool connects the head end of the hydraulic jack with the flow chamber 27 and drain passage 39, and the rod end of the hydraulic jack with the flow chamber 31. The leftward movement of the spool also causes the end face 68 of the land 16 to move toward the annular seat land 34 as shown in FIG. 2 restricting fluid flow through the annular groove 23 from the flow chamber 29 to the flow chamber 30. This causes a build up of fluid pressure in the flow chamber 29 with the increase in pressure unseating the check valve 37 so that fluid passes through the passage 38 to the flow chamber 31 and then to the rod end of the hydraulic jack. The rate of travel of the hydraulic jack is controlled by the amount of fluid directed thereto with the amount of fluid directed thereto being established by the metering of fluid through the metering slots 66 and more specifically through the semielliptical openings 71 and the cylindrical pockets 69. The flow through the cylindrical pockets is a metering out condition and generally takes a path shown by the dash line arrows in FIG. 2 wherein the resulting efflux fluid flow is directed radially outwardly substantially normal to the axis of the valve spool. Under controlled test conditions, which will hereinafter be described in greater detail, it has been found that the flow force of the fluid acts on the spool in a direction tending to close the metering slots.

Similarly, shifting the selector valve 56 in the opposite direction results in movement of the valve spool 11 to the right so that as the end face 67 of the land 15 approaches the annular seat land 34, fluid flow from flow chamber 29 to flow chamber 30 is again restricted causing the fluid in the chamber 29 to be pressurized to a relatively high pressure depending in part upon the load on the hydraulic jack. Thus, a portion of the fluid is directed through the passage 38, flow chamber 28 and to the head end of the hydraulic jack 43 causing extension thereof while the remaining portion of the fluid is metered through the metering slots 66 into the flow chamber 30 which is at substantially atmospheric pressure. The rate of travel of the hydraulic jack is established by the metering of fluid through the metering slots 66 and more specifically through the rectangular openings 73 and the portion of the grooves 72 formed in the land 15 and in combination with the key cutter slots 77. The fluid flow through the rectangular openings is a meter in condition and generally takes the path shown by the arrows in FIG. 3 wherein a portion of the fluid tends to follow the longitudinally extending grooves 72 and is directed into the cylindrical pockets 69 which changes the direction of travel of the fluid and directs it generally in the opposite direction to the movement of the spool 11. However, a portion of the fluid metered in leaves the grooves and impinges against the fluid flow leaving the cylindrical pocket resulting in the fluid flow being substantially radially outwardly. Thus in the meter in condition, the longitudinally extending grooves function as cylindrical pocket fluid feeding grooves. Again under the same test conditions used for the meter out condition of the valve spool, it has been found that the resulting flow force of the fluid acting on the spool is in a direction aiding movement of the spool and tending to close the metering slots and is substantially equal in magnitude to the flow force reacting against the spool in the meter out condition.

The test conditions employed to measure the reaction force on the spool consists of directing fluid into the inlet port 36 at the rate of 140 gpm. Fluid communication between the flow chamber 29 and the passage 38 is blocked and a relief valve is connected to the inlet port to simulate a 3,000 psi load. The centering mechanism 51 was deleted for the test. The valve spool was shifted by a hydraulic actuator and a load cell was inserted between the valve spool and the and the hydraulic actuator to measure both the magnitude and direction of the flow force reacting on the spool.

With the metering slots 66 of the present invention, the flow forces reacting on the valve spool for both the meter in and meter out condition are 75 lbs. with both flow forces tending to close the metering slot. This means that the valve spool will be shifted from its centered position an equal amount in either direction if a predetermined force is applied either end of the spool. Thus, the amount of shifting of the valve spool will be commensurate with the amount of shifting of the selector valve in both directions.

In view of the foregoing, it is readily apparent that the structure of the present invention provides an improved metering slot configuration for a valve spool which provides a force acting on the spool tending to close the metering slot in both the meter in and meter out conditions with the forces being substantially equal in magnitude in both conditions. This is accomplished by utilizing the flow force reducing characteristics of the end mill slot or cylindrical pockets to minimize the flow forces acting on the spool during the meter out condition. Moreover, directing the fluid metered in through the metering slots through the longitudinally extending grooves and into the cylindrical pockets causes the fluid to be directed substantially radially outwardly and in so doing, the force created by the reaction of the fluid against the walls of the cylindrical pockets is sufficient to also provide a force tending to close the metering slot during the meter in condition.

While the invention has been described and shown with particular reference to the preferred embodiment, it will be apparent that variations might be possible that would fall within the scope of the present invention, which is not intended to be limited except as defined in the following claims.

What is claimed is:

1. A fluid control valve comprising:
a body having a pump inlet port and a drain outlet port formed therein and being of a construction sufficient for connecting the pump inlet port to a relatively high pressure pump and the drain outlet port to a substantially atmospheric pressure reservoir; and
a valve spool having a longitudinal axis, first and second lands, a reduced diameter portion positioned between the first and second lands and a metering slot leading from a peripheral surface of the first land movable a peripheral surface of the second land, said metering slot including a substantially cylindrical pocket recessed into the second land and generated about an axis disposed at an acute angle relative to the longitudinal axis, and a groove formed in the first land and the reduced diameter portion connecting the peripheral surface of the first land with the cylindrical pocket, said groove having an arcuate surface portion leading from the peripheral surface of the first land and an alongated bottom surface portion positioned substantially parallel to the longitudinal axis and tangent to the arcuate surface portion, said spool being movably along its longitudinal axis between a first position at which fluid flow from the pump inlet port to the drain outlet port is metered outwardly relative to the spool through the cylindrical pocket and a second position at which fluid flow from the pump inlet port to the drain outlet port is metered inwardly through the groove, said metering slot being of a construction sufficient for directing the fluid metered inwardly through the groove into the cylindrical pocket to generate a force acting on the spool tending to close the metering slot.

2. The control valve of claim 2 wherein the control valve is pilot actuated and has a pair of actuation chambers disposed at opposite ends of the spool.

3. The control valve of claim 2 wherein said valve spool is movable to a third position of which substantially unrestricted fluid flow is permitted between the pump inlet port and the drain outlet port, and including a resilient centering mechanism for moving the spool to the third position in the absence of a fluid pressure differential in the actuating chambers.

* * * * *